UNITED STATES PATENT OFFICE.

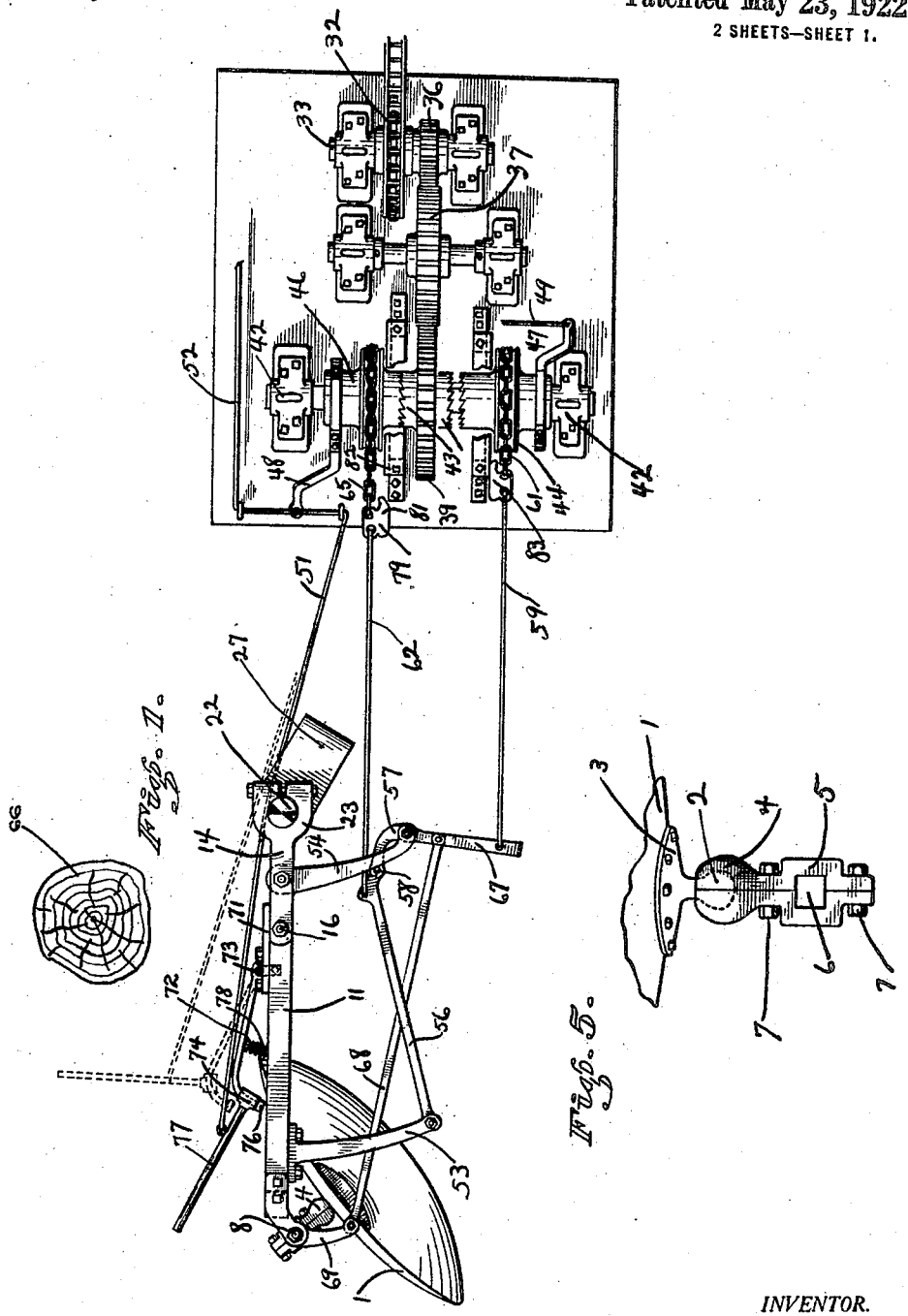

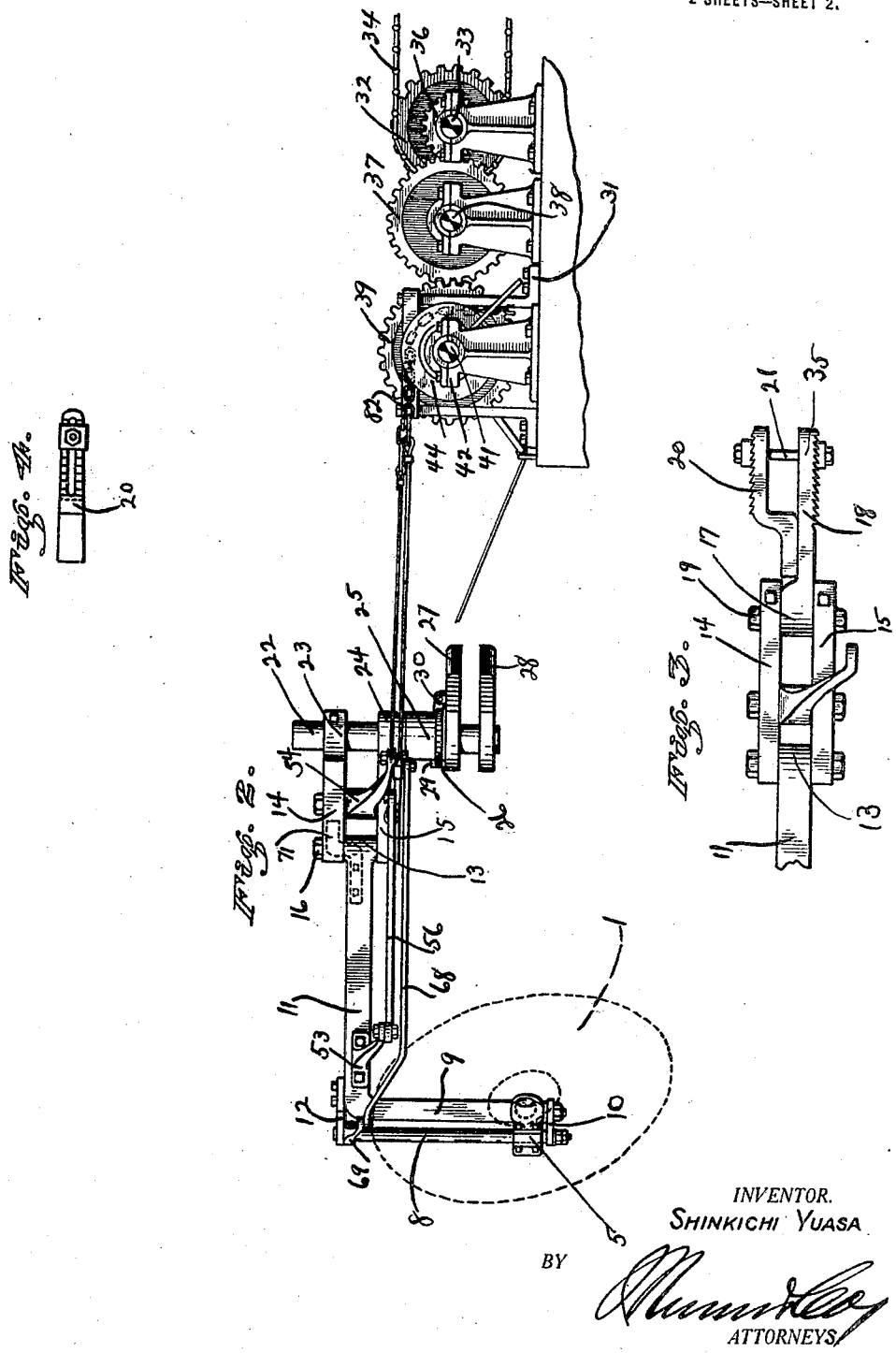

SHINKICHI YUASA, OF CUPERTINO, CALIFORNIA.

DISK PLOW AND THE LIKE.

1,417,221.  Specification of Letters Patent.  Patented May 23, 1922.

Application filed June 1, 1921. Serial No. 474,152.

*To all whom it may concern:*

Be it known that I, SHINKICHI YUASA, a subject of the Emperor of Japan, residing at Cupertino, in the county of Santa Clara and State of California, have invented new and useful Improvements in Disk Plows and the like, of which the following is a specification.

My invention relates to agricultural implements and has reference more particularly to an improvement in disk plows and the like.

As heretofore practiced, disk plows are usually arranged in gang formation on a suitable frame or carriage and towed behind a tractor or other towing medium. In using an implement of this kind, considerable inconvenience is experienced, and in some instances it is impossible to make a furrow close around trees and other obstructions, and also along fence lines and in fence corners, as the disks do not extend far enough out from the frame or carriage which carry them nor are they capable of sufficient horizontal angular adjustment.

In Letters Patent 1,370,079 issued to me March 1st, 1921, I disclosed an improved auxiliary disk, which is adapted to be mounted upon the frame which carries the plow disks, so that the same might be manipulated to assume various horizontal angular positions relative to the frame for the purpose of turning a furrow close to fences, fence corners and other places not ordinarily accessible to the conventional types of implements.

The present invention contemplates an apparatus which is also in the nature of an auxiliary disk, with practically the same advantages as in my former construction, but it also includes further features, which are in the nature of improvements enabling this improved construction to accomplish still further features, which were not contemplated in the former construction.

In the accompanying drawings, which form a part of the following specification, I have disclosed an embodiment of the apparatus which may be used as a basis for reducing the invention to practice. In said drawings Figure 1 is a plan view of the auxiliary disk construction and showing also in plan the operating mechanism; Figure 2 is a view in side elevation of the apparatus; Figure 3 is a detailed view of the means for connecting the auxiliary disk to the implement frame; Figure 4 is a detailed view in plan of a slotted clamping jaw and Figure 5 is a detailed view of the swiveled mounting for the disk.

Referring now to the drawings in detail: The disk 1 is mounted with freedom of rotation by means of the ball 2 centered upon the back of the disk by the flange 3 and with the ball confined in a socket 4 which forms an integral part of the clamp 5 made with a squared opening 6. The socket 4 as well as the clamp 5 is made in two sections, which are adapted to be joined together by suitable bolts 7. Received in the square opening 6 in the clamp 5 is a vertical post 8, which has a squared portion made to correspond to the square of the opening 6 at one end. The post 8 is mounted in parallel spaced relation relative to the downwardly presented standard 9 and with the same fixed thereto at its lower end by the bracket plate 10. The opposite end of the post 8 is mounted to the horizontal arm 11 through means of a bracket plate 12. With this construction the disk 1 is primarily mounted to the post 8, but the standard 9 acts in the nature of a secondary support since the post 8 is fixed thereto.

Arm 11 at its forward end terminates in an eye 13 to provide a pivotal mounting between the parallel bearing members 14 and 15, a suitable bolt 16 being employed in this instance to extend through the members 14 and 15 and the eye 13. In Figure 3 the members 14 and 15 are made to receive an eye 17 of a clamping jaw 18, a bolt 19 passing through the members and the eye 17 to provide a pivotal mounting for the jaw member 15 so that an opposed detachable jaw member 20 may co-operate with the member 25 to which it is attached by the bolt 21, to provide an attaching means for connecting the auxiliary disk to the frame behind which it is to be towed. In Figure 2, which is the preferred form, the members 14 and 15 are secured to a vertical column 22 and for this purpose the member 14 terminates in a split clamping wrist 23 while the member 15 terminates in a sleeve or eye 24. The column 22 for its lower portion is threaded to receive a threaded nipple 35 having on the end thereof a toothed flange 26. The nipple 35 may be threaded up or down on the column to clamp or release the parallel jaws 27 and 28, which are mounted with freedom of vertical movement on the column and the upper one of which, namely 27, carries in its rear the clip 29 which straddles the tooth flange 26 so that the same is primarily carried by the nipple 25 and with a dogging device 30 on the jaw 27 made to engage the teeth of the flange 26 to hold the nipple 25 against rotation and thus maintain a clamping effect between the jaws. These jaws may be relied upon to connect the auxiliary disks to the frame behind which it is to be towed in the same capacity as the attaching construction described with reference to Figure 3. It might be well to mention that the jaws 20 and 18 shown in Figure 3 are provided with elongated slots in which the bolt 21 may be moved back and forth and with teeth on the outer surfaces made to hold an adjustment of the bolt longitudinally of the jaws by means of the nut on the bolt.

With the construction so far described it will be appreciated that the disk 1 is capable of a swinging horizontal movement through means of its pivoted connection at the eye 13. However, there are two reasons for moving the disk to various angular positions, first of which will be to present the same in inaccessible places where a furrow is desired to be turned and another reason will be to remove the same out of the way of an obstruction, such for instance as a tree. The latter movement of the disk is accomplished automatically, but the former movement is manually controlled.

The shifting of the disk is accomplished by means of the transmission 31 which may be imagined, for the purposes of the present illustration, to be secured on the main plow and receive power either from the tractor directly or from any rotating shaft of the main plow. It comprises a sprocket wheel 32 on the shaft 33 driven by means of the chain 34, a smaller gear wheel 36 keyed to the same shaft and engaging the gear wheel 37 on the shaft 38, which latter drives the gear wheel 39 keyed to the shaft 41 supported in the bearings 42. The hub 43 of the latter gear wheel is toothed at either end and adapted to be engaged by either of two clutch members 44 and 46 rotatably and slidably secured on the shaft on each side of the gear wheel 39. Each clutch member is controlled by a forked lever 47 and 48, the former being adapted to be manually operated through the rod 49, while the latter is operated automatically by the cable 51 or manually by the cable 52.

To control the disk by these clutch members I provide two attachments, one for actuating and positioning the disk and one for automatically setting in motion the actuating means.

The disk actuating and positioning means comprise two arms 53 and 54 extending sideways from the main frame member, one being rigidly secured to the rear portion 11, while the other is secured between the front members 14 and 15. These two arms are normally parallel to each other, but their free ends are adapted to be drawn together by a lever arrangement consisting of a link 56, one end of which is pivotally secured in the end of the arm 53 and a bell crank lever 57 fulcrumed in the end of the other arm 54, one end of which is pivotally engaged by the free end of the link 56, as shown at 58, while the other end is connected, by means of a cable 59, to a chain 61 secured to and wound on the clutch member 44. Another cable 62 connects the forward end of the link 56 to the chain 65 wound on the other clutch member 46.

Remembering that the two portions 11 and 14—15 of the main frame members are pivotally connected at 16 and that the portion 14—15 is directly acted on by the draw bar and will therefore as nearly as possible maintain its general direction with reference to the line of draft, it will be seen that a forward pull on the cable 62, such as would be occasioned by winding the chain 65 on the clutch member 46, will pull the forward end of the arm 53 forward and thereby swing the frame member 11 on its pivot 16. In doing this it would, at the same time, throw the disk 1 to the right and away from any object, like a tree standing in close proximity to the plow at its left hand side, as indicated at 66 in the drawing.

The arm 67 of the lever 57 is further pivotally connected, by the link 68, to an arm 69 rigidly secured to the shaft 8 and it will be seen that a forward pull on the cable 62 will throw the arm 67 backward, which motion is transmitted to the arm 69, which as a consequence turns the shaft 8 and the disk 1 so that the latter assumes a longitudinal position with reference to the line of draft and becomes inactive. In this manner a forward pull on the cable 62 throws the disk to the right and sets it so as to make it inactive.

It will be easily understood that a forward pull on the cable 59 will return the disk to its previous position, alining the two frame members 11 and 14 and setting the disk at its working angle. To prevent the frame member 11 from going beyond the straight position, I provide a stop 71 secured to the frame member 11 and bearing against the member 14.

In case a tree is passed it is desirable that the disk should automatically assume a position in which it will clear the same. This is done by means of the mechanism shown at the left-hand side of the disk, which consists of a rod 72, one end of which is pivotally secured in the frame member, as shown at 73, while the other end is bent toward the frame member and provided with a head 76, adapted to prevent a T 74 slidably secured on the rod from sliding off. This T is large enough to freely pass the curve of the rod, but does not rotate thereon, and carries a second rod 77 which is connected with the clutch member 46 by the cable 51. A spring 78 normally keeps the rod 72 at a certain distance from the frame member 11.

Normally the attachment last described is in the position shown in dotted lines in Figure 1. As a tree is passed the rod 77 hits the same and is thrown backward, thereby pulling on the cable 51 which in turn actuates the clutch member 46 to engage the gear wheel 39 and causes the same to pull on the cable 62, thereby throwing the disk to the right and simultaneously rendering it inactive.

A clutch release is provided in the link 79 interposed betwen the cable 62 and the chain 65. This link has a lug 81 which presents a slanting surface to a stationary frame member 82 and sliding along the latter forces the chain and with it the clutch member 46 away from and out of engagement with the gear wheel 39, thereby preventing a further pulling on the cable 62. A similar release is provided for the clutch member 44 in the link 83.

The manner of operating my auxiliary disk is easily understood. The draw bar from the main plow is secured between the two clamping members 27 and 28 which latter can be positioned with reference to the frame member 14 by means of the clamp 23, which can be tightened on the shaft 22 in any position desired. When 27 is in line with the link 14—15, the furrow thrown up by the auxiliary disk will be rather close to the last furrow made by the main plow. The further the clamp 27 is turned on its pivot, the further the point of draft will be thrown out of alinement with the frame member 14—15 and the further the disk will reach beyond the last furrow. It thus lends itself admirably to the plowing out of corners and inaccessible places. When a tree is approached and the lever 77 comes in contact with the same, the disk is automatically thrown out of the way of the tree and into an inactive position, to automatically return to the working position after the tree is passed. It is clear that when the clamp 27 is in an angular position with reference to the link 14—15, a mere draft on the clamp will not aline the frame member 11 with the member 14—15 altogether, but will leave a slight bend at 16. When the operator wishes to straighten out the main frame altogether, as for instance in turning a corner, he can manually engage the clutch member 44 with the gear 39 and thereby increase the working radius of the disk, so that in all there are three different positions possible, provided 27 is set at an angle to the frame, firstly the normal working position, in which the frame is slightly bent at 16 and the disk in normal working position, secondly the idling position, in which the frame is bent sharply and the disk does not work, and thirdly the extreme working position, in which the frame is straight and the disk set at an extreme working angle.

I claim:

1. In combination with a gang plow, an auxiliary disk plow comprising two longitudinal frame members pivotally connected to each other, a disk secured to the rearward member, drawing means secured to the front member, and means for selectively adjusting the relative position of the frame members to each other between longitudinal alinement and angular relation, whereby the position of the disk is changed relative to the line of draft.

2. In combination with a gang plow, an auxiliary disk plow comprising two longitudinal frame members pivotally connected to each other, a disk secured to the rearward member, drawing means secured to the front member, an arm extending sideways from each member, and means actuating the free ends of said arms adapted to selectively adjust the relative position of the frame members to each other between longitudinal alinement and angular relation, whereby the position of the disk is changed relative to the line of draft.

3. In combination with a gang plow, an auxiliary disk plow comprising two longitudinal frame members pivotally connected to each other, a disk secured to the rearward member, drawing means secured to the front member, an arm extending sideways from each member, and means actuating the free ends of said arms adapted to change the relative position of the frame members to each other from longitudinal alinement to angular relation whereby the furrow drawn by the disk is narrowed, and means for automatically effecting this change when an obstacle is encountered.

4. In combination with a gang plow, an auxiliary disk plow comprising two longitudinal frame members pivotally connected to each other, a disk secured to the rearward member, drawing means secured to the front member, and means for selectively adjusting the relative position of the frame members to each other between longitudinal alinement and angular relation, whereby the position of the disk is changed relative to the line of draft, and means for rendering the disk inactive when the frame members are in the angular position.

5. In combination with a gang plow, an auxiliary disk plow comprising two longitudinal frame members pivotally connected to each other, a disk secured to the rearward member, drawing means secured to the front member, an arm extending sideways from each member, and means actuating the free ends of said arms adapted to selectively adjust the relative position of the frame members to each other between longitudinal alinement and angular relation, whereby the position of the disk is changed relative to the line of draft, and means for rendering the disk inactive when the frame members are in the angular position.

6. In combination with a gang plow, an auxiliary disk plow comprising two longitudinal frame members pivotally connected to each other, a disk secured to the rearward member, drawing means secured to the front member, an arm extending sideways from each member, and means actuating the free ends of said arms adapted to change the relative position of the frame members to each other from longitudinal alinement to angular relation whereby the furrow drawn by the disk is narrowed, and means for automatically effecting this change when an obstacle is encountered, and means for simultaneously rendering the disk inactive.

7. In combination with a gang plow, an auxiliary disk plow comprising two longitudinal frame members pivotally connected to each other, a disk secured to the rearward member, drawing means secured to the front member, adapted to normally keep the two frame members in angular relation, means for increasing the angle between the two members whereby the furrow drawn is widened and means for decreasing the angle whereby the furrow thrown up is narrowed.

8. In combination with a gang plow, an auxiliary disk plow comprising two longitudinal frame members pivotally connected to each other, a disk secured to the rearward member, drawing means secured to the front member, adapted to normally keep the two frame members in angular relation, an arm extending sideways from each member, and means actuating the free ends of said arms adapted to increase the angle between the two members, whereby the furrow drawn is widened or to decrease the angle whereby the furrow is narrowed.

9. In combination with a gang plow, an auxiliary disk plow comprising two longitudinal frame members pivotally connected to each other, a disk secured to the rearward member, drawing means secured to the front member, adapted to normally keep the two frame members in angular relation, an arm extending sideways from each member, means actuating the free ends of said arms adapted to selectively decrease the angle between the two frame members, whereby the furrow drawn is narrowed and means for automatically effecting this decrease when an obstacle is encountered.

10. In combination with a gang plow, an auxiliary disk plow comprising two longitudinal frame members pivotally connected to each other, a disk secured to the rearward member, drawing means secured to the front member, adapted to normally keep the two frame members in angular relation, an arm extending sideways from each member, means actuating the free ends of said arms adapted to selectively decrease the angle between the two frame members, whereby the furrow drawn is narrowed and means for automatically effecting this decrease when an obstacle is encountered, and means for rendering the disk inactive, when the frame members are in the extreme angular position.

11. In combination with a gang plow, an auxiliary disk plow comprising two longitudinal frame members pivotally connected to each other, a disk secured to the rearward member, drawing means secured to the front member, adapted to normally keep the two frame members in angular relation, an arm extending sideways from each member, and means actuating the free ends of said arms adapted to increase the angle between the two members, whereby the furrow drawn is widened or to decrease the angle whereby the furrow is narrowed, and means for automatically effecting the decrease of said angle when an obstacle is encountered.

12. In combination with a gang plow, an auxiliary disk plow comprising two longitudinal frame members pivotally connected to each other, a disk secured to the rearward member, drawing means secured to the front member, adapted to normally keep the two frame members in angular relation, an arm extending sideways from each member, and means actuating the free ends of said arms adapted to increase the angle between the two members, whereby the furrow drawn is widened or to decrease the angle whereby the furrow is narrowed, and means for automatically effecting the decrease of said angle when an obstacle is encountered, and means for simultaneously rendering the disk inactive.

SHINKICHI YUASA.